United States Patent
Anghel

(10) Patent No.: US 7,208,908 B2
(45) Date of Patent: Apr. 24, 2007

(54) APPARATUS AND METHOD TO CONTROL TORQUE AND VOLTAGE OF AN AC MACHINE

(75) Inventor: Cristian E. Anghel, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/889,712

(22) Filed: Jul. 12, 2004

(65) Prior Publication Data

US 2006/0006829 A1    Jan. 12, 2006

(51) Int. Cl.
H02P 1/46 (2006.01)
H02P 6/00 (2006.01)
H02P 27/00 (2006.01)

(52) U.S. Cl. ............... 318/712; 318/439; 318/254; 318/700; 318/722

(58) Field of Classification Search ............... None
See application file for complete search history.

(56) References Cited

U.S. PATENT DOCUMENTS

| | | | |
|---|---|---|---|
| 4,814,677 A * | 3/1989 | Plunkett | 318/254 |
| 4,868,406 A | 9/1989 | Glennon et al. | |
| 5,298,847 A * | 3/1994 | Kerkman et al. | 318/800 |
| 5,300,870 A * | 4/1994 | Smith | 318/768 |
| 5,430,362 A | 7/1995 | Carr et al. | |
| 5,493,195 A | 2/1996 | Heglund et al. | |
| 5,493,201 A | 2/1996 | Baker | |
| 5,502,360 A * | 3/1996 | Kerkman et al. | 318/805 |
| 5,717,305 A * | 2/1998 | Seibel et al. | 318/778 |
| 5,796,194 A * | 8/1998 | Archer et al. | 310/68 B |
| 5,801,516 A | 9/1998 | Rice et al. | |
| 5,852,334 A * | 12/1998 | Pengov | 310/168 |
| 5,903,130 A | 5/1999 | Rice et al. | |
| 5,986,419 A * | 11/1999 | Archer et al. | 318/254 |
| 6,011,377 A | 1/2000 | Heglund et al. | |
| 6,107,775 A | 8/2000 | Rice et al. | |
| 6,188,203 B1 | 2/2001 | Rice et al. | |
| 6,377,017 B2 * | 4/2002 | Kondou et al. | 318/727 |
| 6,396,229 B1 * | 5/2002 | Sakamoto et al. | 318/439 |
| 6,452,357 B1 | 9/2002 | Jahkonen | |
| 6,528,967 B2 | 3/2003 | Hallidy | |
| 6,737,828 B2 * | 5/2004 | Kiuchi et al. | 318/779 |
| 6,867,525 B2 * | 3/2005 | Ionel et al. | 310/156.47 |
| 2001/0009363 A1 | 7/2001 | Rice et al. | |
| 2002/0043954 A1 | 4/2002 | Hallidy | |
| 2004/0052217 A1 | 3/2004 | Anghei et al. | |

OTHER PUBLICATIONS

Patent Abstract of Japan, vol. 1996, No. 12, Dec. 26, 1996 & JP 08224000.

* cited by examiner

*Primary Examiner*—Lincoln Donovan
*Assistant Examiner*—Renata McCloud
(74) *Attorney, Agent, or Firm*—Birch, Stewart, Kolasch & Birch, LLP

(57) ABSTRACT

A method of controlling a power converter (258) of a synchronous machine drive system (100) determines position and speed of a rotor (350) of the synchronous machine (300); regulates a current vector relative to a reference frame, having a direct-axis component and a quadrature-axis component, the regulating step selectively causing the current vector to lag a quadrature axis of the machine (300); and outputs a command signal to the power converter (258) as a function of the regulating step. According to one implementation, this process creates higher total torque and maintains supply voltage within a maximum level during a high speed range of the machine.

20 Claims, 5 Drawing Sheets

APPARATUS AND METHOD TO CONTROL TORQUE AND VOLTAGE OF AN AC MACHINE

FIELD OF THE INVENTION

The present invention relates to electrical power conversion, and more particularly to a controller and control technique for a power converter, such as an inverter of a synchronous AC motor drive system.

BACKGROUND OF THE INVENTION

A conventional electromechanical system, as utilized for example in the aerospace industry, includes a synchronous machine that generates multi-phase AC power from a rotating shaft, e.g., coupled to a gas turbine engine, and DC excitation. In addition to operating in a generator mode, the synchronous machine operates as a starter (motor) to start the aircraft engine. Following a successful engine start the system initiates the generator mode. In such applications where an AC electrical machine is used as a starter, it is desirable to provide a high starting torque with a power conversion device (e.g., inverter) having a limited input voltage. It is often difficult to provide and maintain the required starting torque, particularly in the constant power region (corresponding the high speed range) of the starting operation, with a power conversion device having a limited input/output voltage. This limitation in voltage is typically due to a fixed DC link available as input to the power conversion device. This limitation in existing systems results in non-optimal starter performance due to insufficient torque or due to the requirement for increased voltage (i.e., exceeding a maximum level).

Conventionally, motor controllers for applications requiring a controlled torque use discrete sensors, such as resolvers, to determine rotor position in a rotating machine. In addition, sensorless techniques have been developed to derive rotor position for motor drive control. A conventional motor drive control system is shown in FIG. 1. The primary components of the system include a power source 50, a controller (drive) 20, a motor generator 30, and a speed/position sensor 40. The controller 20 includes inverter controls 26 that receive signals from the position sensor 40 (e.g., speed/rotor position) and the motor generator 30 (e.g., current, voltage). These signals are used to control the main inverter 22 and exciter inverter 24, thereby providing a conventional closed loop system to regulate current supplied to the main inverter 22 as a function of the speed of the motor generator 30, as will be appreciated by those skilled in the art. Typically, during start, output current of the exciter inverter 24 is controlled to achieve field weakening based on rotor speed.

In generator mode, DC excitation of an exciter field winding and rotation of the generator shaft by the engine causes the generation of a polyphase voltage that is rectified and coupled to a main rotor field winding, which causes a rotating magnetic field in a main stator coil to produce output power with regulated voltage at a point of regulation (POR) for delivery to an AC bus. The DC current flowing through the exciter field winding may be varied in amplitude to achieve the desired magnitude of AC voltage on the AC bus.

When the motor/generator 30 is used to start the engine, power from the power source 50 is coupled to the synchronous motor/generator via the main inverter 22, which supplies controlled AC power to the main stator windings of the machine, such that sufficient torque is produced by the motor/generator 30. This torque is produced by the interaction between the flux in the main rotor winding and the current (flux) established in the main stator coil. The frequency of the controlled AC power from the main inverter 22 is increased from 0 Hz (0 RPM) to a predetermined frequency corresponding to the angular speed of the motor/generator 30 at the end of start. The phase of the current for the supplied AC power input is controlled as a function of rotor position/speed to develop the desired torque for motor/generator 30.

As rotor speed increases, back electromotive force (emf) generated in the motor proportionally increases, and opposes the supplied voltage, thereby requiring increased supply voltage to create sufficient current, which produces torque for engine start. During the high speed range of the start mode, the supply voltage at the input terminals of the motor/generator 30 needed to achieve sufficient torque may result in a supply voltage amplitude that exceeds a maximum acceptable levels, resulting in the requirement for a high supplied DC link voltage. This DC link voltage is limited by practical considerations, such as the maximum voltage of the power supply, the component rating, etc.

SUMMARY OF THE INVENTION

In one aspect, the present invention is a method of controlling a power converter of a synchronous machine drive system, the method comprising: determining position and speed of a rotor of the synchronous machine; regulating a current vector relative to a reference frame, having a direct-axis component and a quadrature-axis component, the regulating step selectively causing the current vector to lag a quadrature axis of the machine; and outputting a command signal to the power converter as a function of the regulating step.

In another aspect, the present invention is a power converter controlling apparatus for controlling a power converter of a synchronous machine drive system, the controlling apparatus comprising: a current controller for generating power converter command signals by determining position and speed of a rotor of the synchronous machine; regulating a current vector relative to a reference frame, having a direct-axis component and a quadrature-axis component, the regulating step selectively causing the current vector to lag a quadrature axis of the machine; and outputting a command signal to the power converter as a function of the regulating step, wherein the regulating operation performed by the current controller selectively causes the current vector to lag a quadrature axis of the machine by an angle that achieves a positive reluctance torque in the machine, which is added to interaction torque created in the machine to increase total torque.

BRIEF DESCRIPTION OF THE DRAWINGS

Other aspects of the present invention will become apparent from the following description taken in conjunction with the accompanying drawings, in which.

DETAILED DESCRIPTION

Embodiments of the present invention are more specifically set forth in the following description, with reference to the appended drawings. In the following description and accompanying drawings, like elements are denoted with similar reference numbers. Further, well-known elements and related explanations are omitted so as not to obscure the inventive concepts presented herein.

In one aspect, the present invention is a method and apparatus for controlling torque and voltage of a synchronous AC machine. In one implementation, sufficient torque is generated in the high speed range of the machine while maintaining voltage at the input/output of a power conversion device that supplies AC voltage to the machine within acceptable limits. As will be described in greater detail below, this is achieved in one implementation of the present invention by changing the control angle of the power conversion device (e.g., inverter) in a closed loop to achieve: (1) positive reluctance torque, in addition to the interaction torque generated by interaction between the flux in the main rotor winding and the current (flux) in the main stator coil; and (2) limiting of the voltage required by the machine to produce this total torque. As used herein, the term "control angle" means the angle between a current phasor and the quadrature (q) axis of the machine, which is aligned with back emf generated in the machine.

Figure 1:
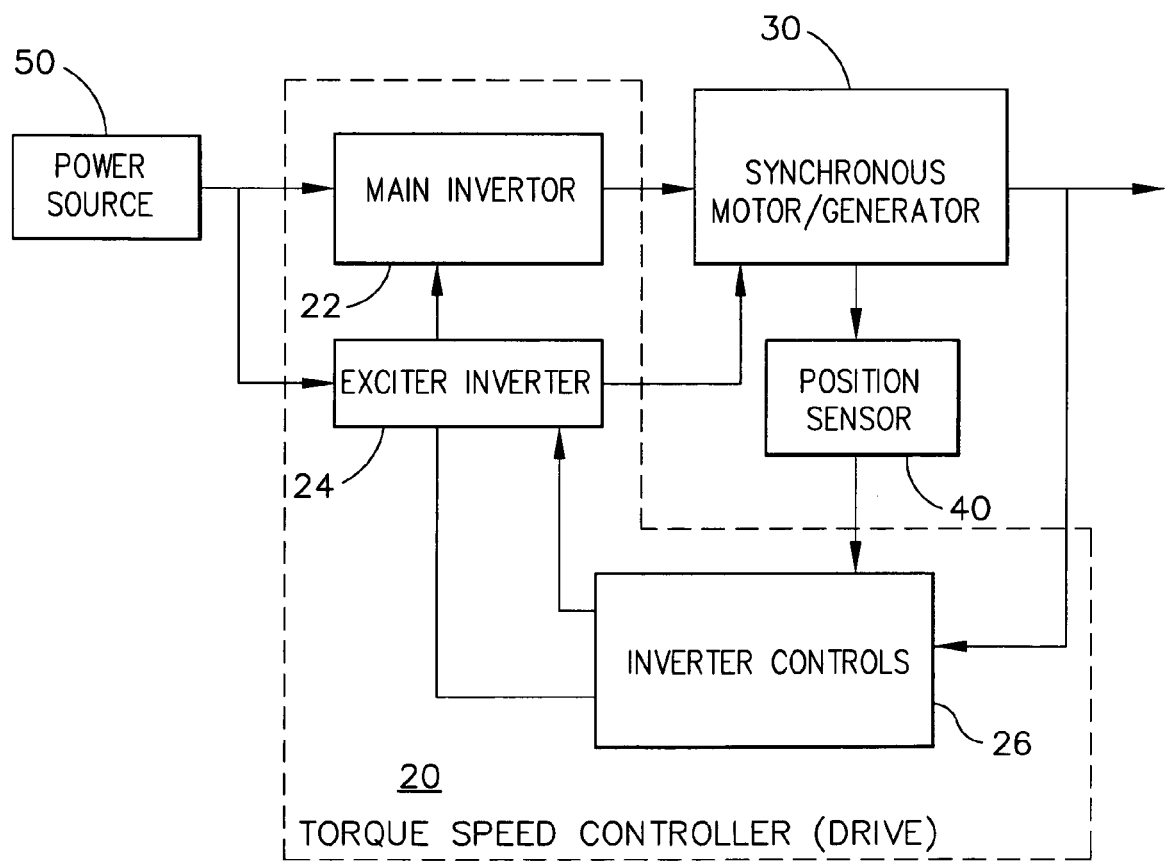
FIG. 1 is a block diagram of a conventional synchronous machine drive system.
Figure 2:
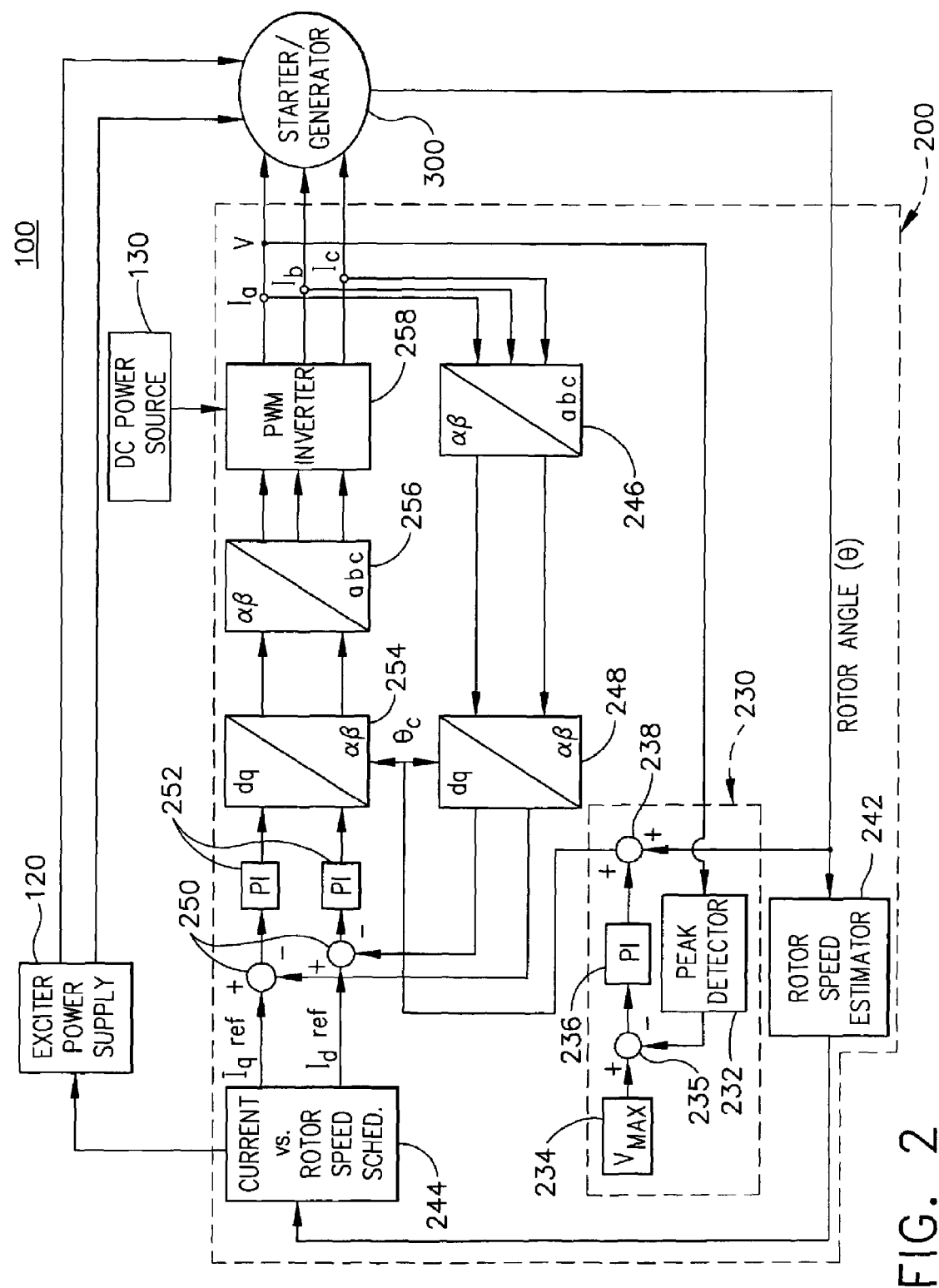
FIG. 2 is a block diagram of a synchronous machine drive system incorporating the power conversion control principles according to an embodiment of the present invention.
Figure 3:
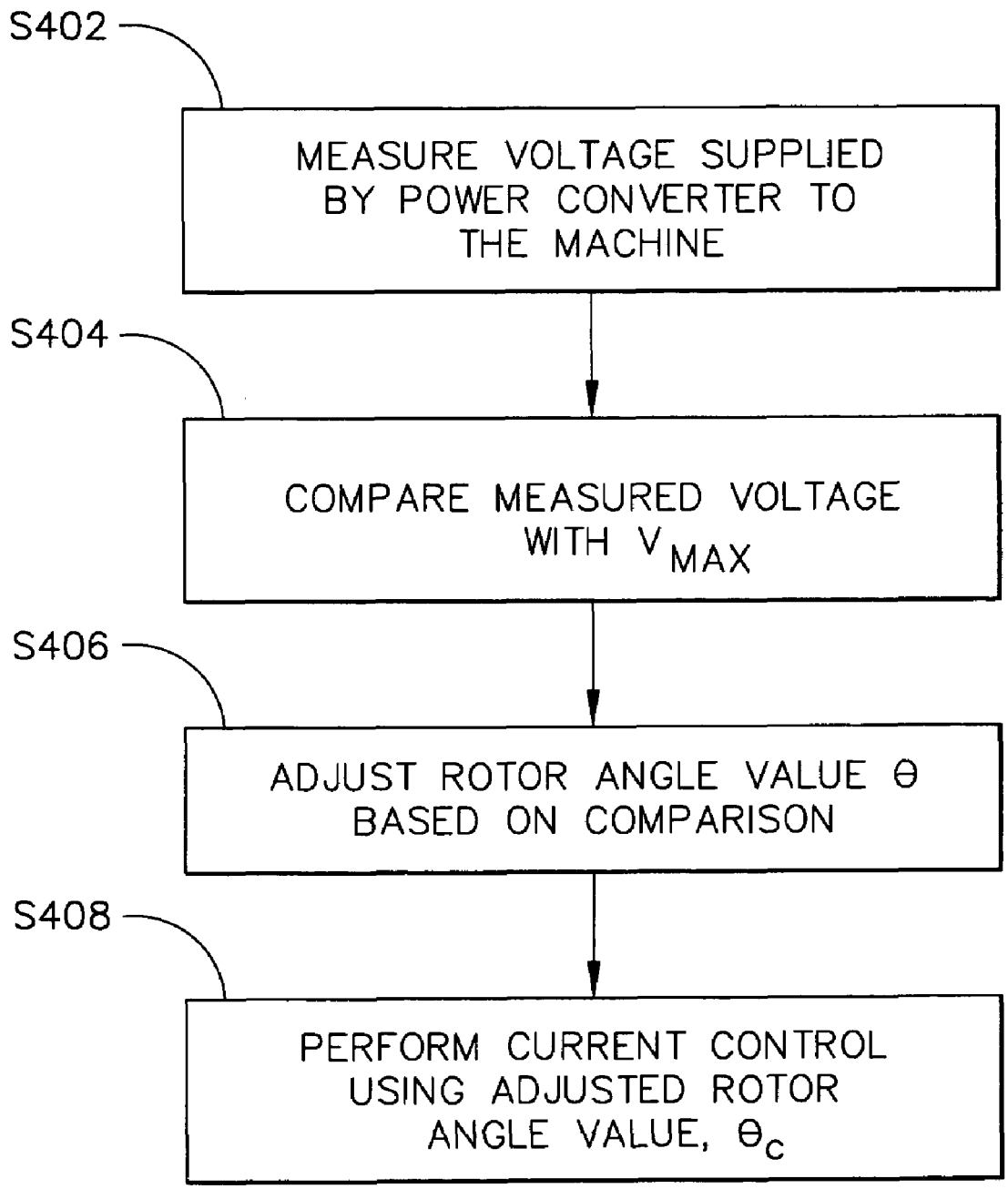
FIG. 3 is a flow diagram illustrating a power conversion control operation according to an embodiment of the present invention.
Figure 4:
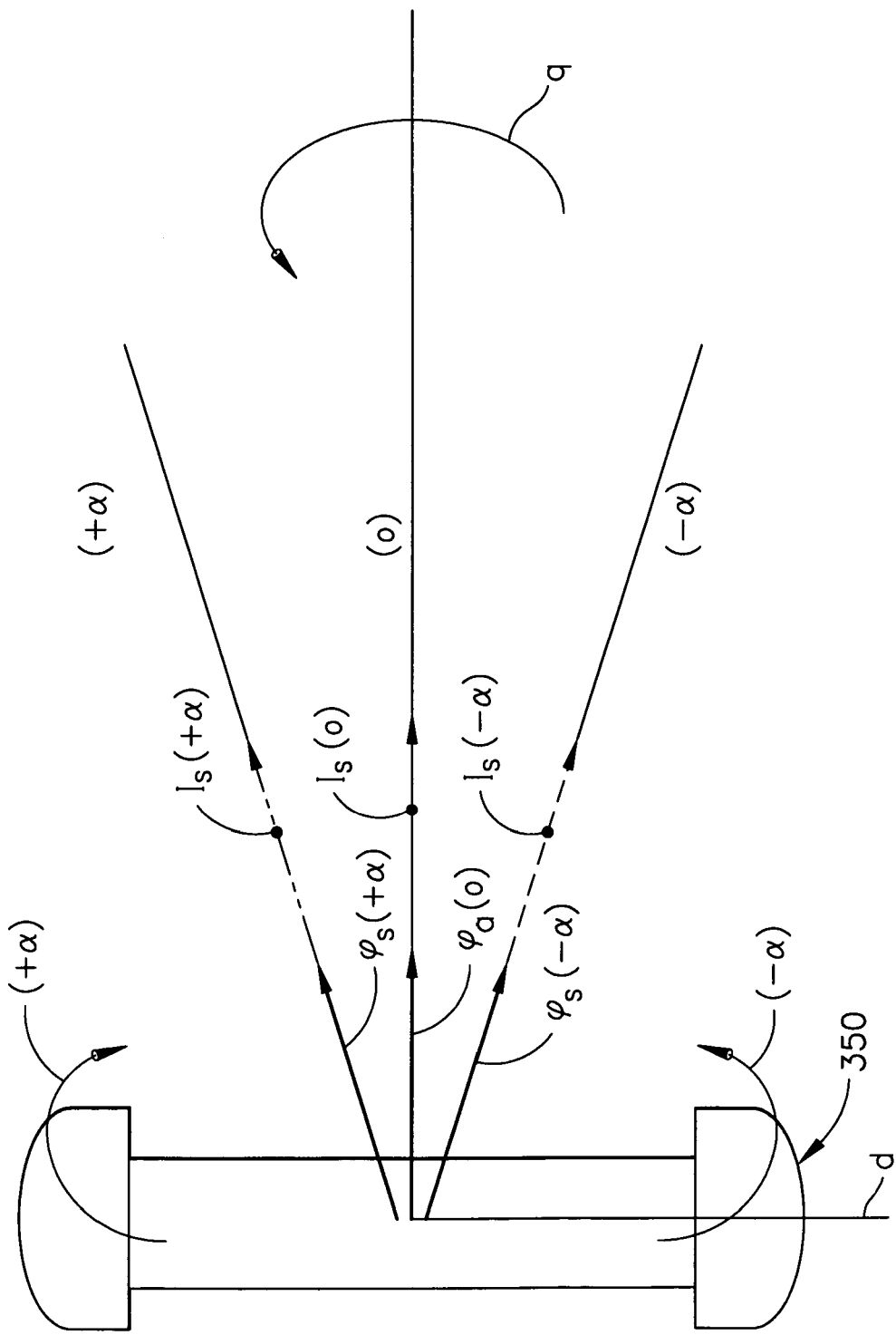
FIG. 4 is a vector diagram illustrating principles of current control according to an embodiment of the present invention.
Figure 5:
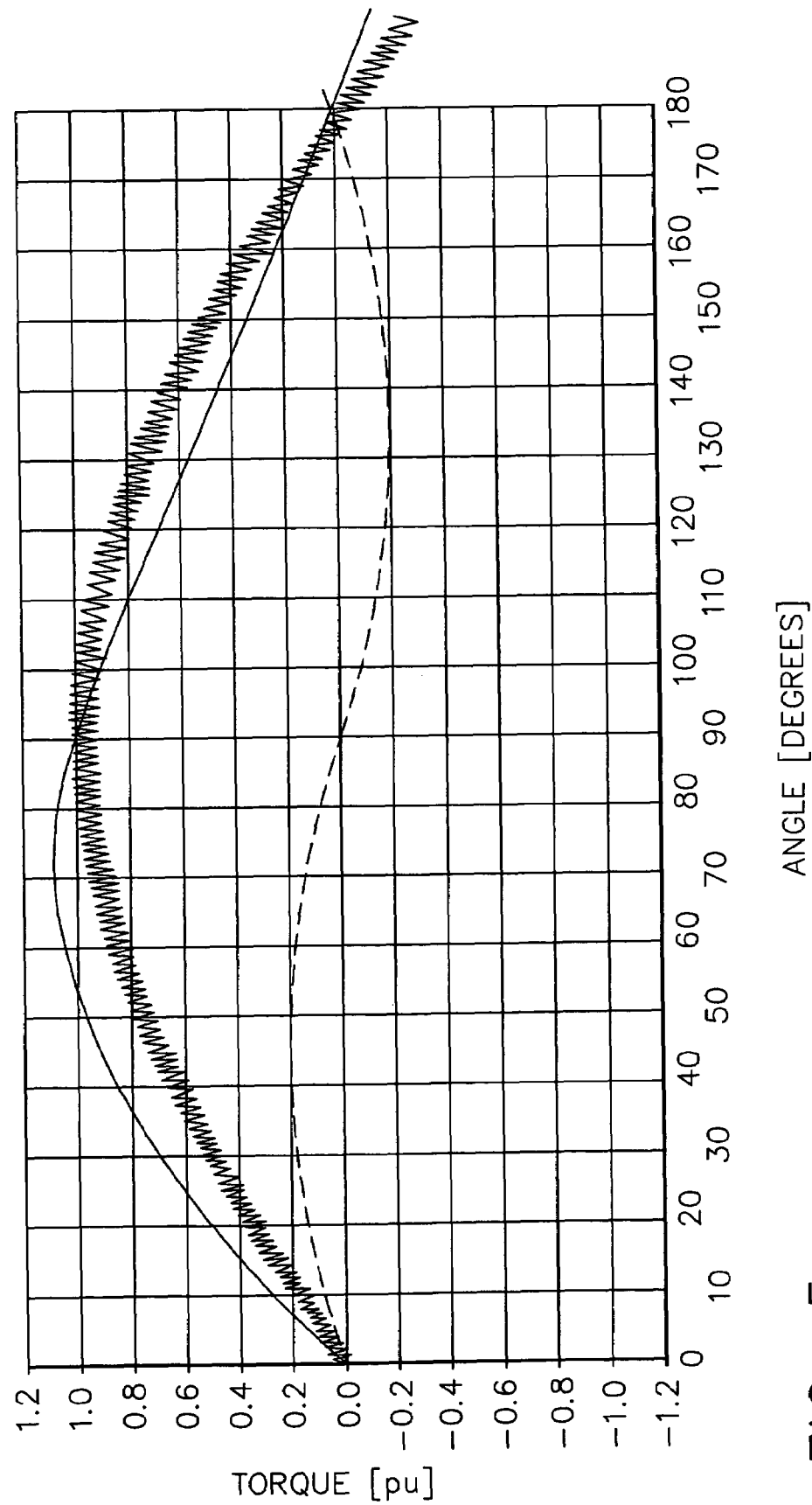
FIG. 5 is a diagram illustrating the relationship between control angle, and total torque/reluctance torque/interaction torque in accordance with an implementation of the present invention.

An embodiment of the present application will next be described with reference to FIGS. 2–5. FIG. 2 illustrates an AC synchronous motor system 100 incorporating power converter control according to an embodiment of the present invention. FIG. 3 is a flow diagram illustrating a power conversion control operation according to an embodiment of the present invention. FIG. 4 is a vector diagram illustrating principles of current control according to an embodiment of the present invention. FIG. 5 is a diagram illustrating the relationship between control angle, and total torque/reluctance torque/interaction torque in accordance with an implementation of the present invention.

With reference to FIG. 2, the AC synchronous motor system 100 includes the following main components: a synchronous starter/generator 300; a DC power source 130; a current speed controller (drive) 200; and an exciter power supply 120. In the embodiment of FIG. 2, the drive 200 utilizes an inverter 258 with PWM (Pulse Width Modulation) control to supply AC power to the motor 300. The inverter 258 can also be implemented with other control techniques, e.g., space vector modulation. The synchronous motor 300 may be a brushed or brushless wound field synchronous motor or a permanent magnet synchronous motor (PMSM), although principles of the present invention are not limited to such an environment. Also, although the AC synchronous machine in FIG. 2 is a starter/generator, principles of the present invention described herein may be applied to other types of AC synchronous machines. The inverter 258 converts DC power from DC power source 130 into three-phase AC power, e.g., utilizing a configuration of insulated-gate bipolar transistors (IGBTs) under control of a PWM Generator and switch driver. The drive 200 controls the inverter 258 to convert DC power from the DC power source 130 and output the desired multi-phase AC power to the stator windings of motor 300. Thus, during operation of the synchronous motor 300, the drive 200 supplies multi-phase AC power to stator windings of the motor 300, creating a rotating magnetic field that interacts with the rotor's magnetic field to create torque. Thus, proper control of the inverter 258, as a function of rotor position/speed, generates a rotating magnetic field that results in efficient motor function over the entire rotor speed range. The drive 200 includes a rotor speed estimator 242, which estimates rotor speed from rotor angle values, and a current/rotor speed scheduler 244.

Those skilled in the art will appreciate that controlled AC power from the exciter power supply 120 is applied to the field winding of the rotor of the starter generator 230 during the start mode.

Those skilled in the art will appreciate that the drive 200 includes elements of a conventional inverter control system, applying concepts of current control in the direct (d) and quadrature (q) axis. As shown in the configuration of FIG. 2, the rotor position feedback signal (e.g., generated by a resolver or by some sensorless technique) is fed into the rotor speed estimator 242, which outputs estimated rotor speed values to the Current vs. Rotor Speed scheduler 244, which generates appropriate current reference signals ($I_q$ref, $I_d$ref) for the forward loop of the current controller. The drive 200 further includes: a Clarke transform unit 246 for transforming multi-phase line current values $I_a$, $I_b$, $I_c$ into direct and quadrature components of a stationary stator frame α, β; a Park transform unit 248 for calculating rotating reference frame quantities $I_q$ and $I_d$; and summing elements 250, which output the difference between quadrature ($I_q$ref) and direct ($I_d$ref) axis current reference signals and $I_q$ and $I_d$, respectively. The outputs of the summing elements 250 are supplied to respective proportional integral (PI) controllers 252, which output command signals in the d, q domain. The drive 200 further includes an inverse Park transform unit 254 that converts the d, q frame command signals output from the PI controllers 252 into the two-phase orthogonal stationary system (α, β) based on the rotor angle θ, and an inverse Clarke transform unit 256, which converts the α, β command signals generated by the inverse Park transform unit 254 into multi-phase command signals, which are output to control the inverter 258.

In this embodiment, the current is regulated using analog or digital PI controllers 252, which use the current vs. speed schedule to generate the signals needed to drive the inverter 258. Although the above-referenced control and inverter system has shown specific elements such as PI controllers 252 and a PWM inverter 258, those skilled in the art will appreciate that many variations of the controller/inverter configuration are possible.

Conventional current control for a synchronous AC machine aligns the current vector with the q axis of the machine, resulting in zero reactive current ($I_d$). In contrast, according to the embodiment of FIG. 2, the drive 200 further includes a torque/voltage control unit 230, which selectively changes the control angle of the inverter 258 in a closed loop to achieve: (1) positive reluctance torque, in addition to the interaction torque of the machine 300; and (2) a limitation of the voltage required to produce this torque. More specifically, the torque/voltage control unit 230 receives the rotor angle value θ and selectively generates an adjusted rotor angle value $θ_c$, which is fed into the Park transform unit 248 and the inverse Park transform unit 254. This adjusted rotor angle value $θ_c$ causes the current phasor to lag the q axis of the machine, thereby creating positive reluctance torque that, when added to the interaction torque, results in increased total torque without an increase in supply voltage (voltage at the input terminals of a starter/generator 300). This is achieved because the flux caused by the reactive component of the current caused by angle correction will oppose to the rotor flux, reducing the back emf and therefore the required supply voltage.

In the implementation illustrated in FIG. 2, the torque/voltage control unit 230 includes a peak detector 232; a $V_{max}$ storage unit 234; a first summing element 235; a PI controller 236; and a second summing element 238. The operation and functional interaction of these elements will be described below with reference to the flow diagram of FIG. 3. The peak detector 232 monitors input voltage at a terminal of the starter/generator 300 to detect a peak voltage (S402), which is compared to $V_{max}$ (S404), which indicates the maximum acceptable supply voltage. The first summing element 235 of the torque/voltage control unit 230 outputs the difference between the peak voltage and $V_{max}$, which is fed into the PI controller 236. The PI controller 236 outputs a rotor angle adjustment value when the peak voltage exceeds $V_{max}$ (S400). Therefore, in this embodiment, the rotor angle adjustment will occur only in the high speed range of the start operation. It should be recognized, however, that alternative embodiments could be implemented whereby the rotor angle adjustment is also performed at lower speed ranges of the start operation, although this will not typically be desirable because a requirement for increased current may outweigh the benefits of increased toque/lower supply voltage. This adjusted rotor angle value $\theta_c$ adjusts the operation of the inverter 258 so that voltage supplied at the terminals of the starter/generator 300 is maintained within acceptable limits (S400). At the same time, as the current phasor (Is) lags the q axis of the machine (orthogonal to the rotor 350), as shown in the vector diagram of FIG. 4, a positive reluctance torque is generated, which results in increased total torque. In FIG. 4, the symbol Is(0) represents the alignment of current phasor (Is) with the q axis; the symbol Is(−α) represents the situation where current phasor (Is) lags the q axis by an angle α; and the symbol Is(+α) represents the situation where the current phasor (Is) leads the q axis by an angle α. The resulting effect on torque can be seen in FIG. 5, in which the dashed line represents reluctance torque, the thick solid line represents interaction torque, and the thin solid line represents total torque. In FIG. 5, the angle of 90° represents alignment of the current phasor (Is) with the q axis of the machine. As shown in FIG. 5, there is a range of angles lagging the 90° angle (approximately 5°–30° lagging) at which total torque increases from a positive reluctance torque.

According to an implementation of the present invention, an increase in total torque in excess of 8% is achievable, with a voltage savings of greater than 5%, thereby significantly increasing efficiency of the system.

What is claimed:

1. A method of controlling a power converter of a drive system that drives a synchronous machine using multi-phase AC power, said method comprising:
    determining position and speed of a rotor of said synchronous machine;
    regulating a current vector relative to a reference frame, having a direct-axis component and a quadrature-axis component, said regulating step selectively causing said current vector to lag a quadrature axis of said synchronous machine;
    and outputting a command signal to said power converter as a function of said regulating step thereby controlling multi-phase AC power output by said power converter to said synchronous machine,
    wherein said regulating step selectively causes said current vector to lag said quadrature axis of said machine by an angle that achieves a positive reluctance torque in said machine, said positive reluctance torque being added to interaction torque created in said machine to increase total torque.

2. The method according to claim 1, wherein said regulating step selectively causes said current vector to lag said quadrature axis of said machine by an angle that maintains back emf, and therefore the voltage supplied to said machine within a maximum level.

3. The method according to claim 1, said method further comprising:
    detecting voltage amplitude between said power converter and a synchronous machine; and
    comparing the detected voltage to a reference voltage to output a comparison result;
    wherein said regulating step regulates said current vector as a function of said comparison result.

4. The method according to claim 3, wherein said method further comprises:
    adjusting a rotor position value based on said comparison result; and
    calculating the current vector position in said reference frame as a function of said adjusted rotor position value.

5. The method according to claim 1, wherein
    said regulating step selectively aligns said current vector relative to the reference frame, such that reactive current becomes non-zero.

6. The method according to claim 1, wherein said power converter is an inverter.

7. The method according to claim 1, wherein said synchronous machine is a brushed or brushless wound field synchronous motor or a permanent magnet synchronous motor.

8. The method according to claim 1, wherein said reference frame is calculated by:
    performing a Clarke transform on said phase-current values to calculate a stationary frame; and
    performing a Park transform to generate direct-axis and quadrature-axis components in a rotating reference frame.

9. The method according to claim 1, wherein said angle is in the range of 5–30 degrees.

10. The method according to claim 2, wherein said angle is in the range of 5–30 degrees.

11. A power converter controlling apparatus for controlling a power converter of a drive system that drives a synchronous machine using multi-phase AC power, said controlling apparatus comprising:
    a current controller for generating power converter command signals by:
        determining position and speed of a rotor of said synchronous machine;
        regulating a current vector relative to a reference frame, having a direct-axis component and a quadrature-axis component, said regulating step selectively causing said current vector to lag a quadrature axis of said synchronous machine; and
        outputting a command signal to said power converter as a function of said regulating step thereby controlling multi-phase AC power output by said power converter to said synchronous machine, wherein said regulating operation performed by said current controller selectively causes said current vector to lag said quadrature axis of said machine by an angle that achieves a positive reluctance torque in said machine, said positive reluctance torque being added to interaction torque created in said machine to increase total torque.

12. The apparatus according to claim 11, wherein said regulating operation of said current controller selectively causes said current vector to lag said quadrature axis of said machine by an angle that maintains back emf, and therefore the voltage supplied to said machine within a maximum level.

13. The apparatus according to claim 11, wherein said current controller includes:
   a voltage detecting element for detecting voltage amplitude between said power converter and a synchronous machine; and
   a summing element for comparing the detected voltage to a reference voltage to output a comparison result;
   wherein said regulating operation of said current controller regulates said current vector as a function of said comparison result.

14. The apparatus according to claim 13, wherein said current controller further includes:
   a rotor position adjusting element for adjusting a rotor position value based on said comparison result,
   wherein said current controller calculates the current vector position in said reference frame as a function of said adjusted rotor position value.

15. The apparatus according to claim 11, wherein
   said current controller selectively aligns said current vector relative to the reference frame, such that reactive current becomes non-zero.

16. The apparatus according to claim 11, wherein said power converter is an inverter.

17. The apparatus according to claim 11, wherein said synchronous machine is a brushed or brushless wound field synchronous motor or a permanent magnet synchronous motor.

18. The apparatus according to claim 11, wherein current controller includes:
   a Clarke transform unit for performing a Clarke transform on phase-current values to calculate a stationary frame; and
   a Park transform for generating direct-axis and quadrature-axis components in a rotating reference frame based on the output of said Clarke transform unit.

19. The apparatus according to claim 11, wherein said angle is in the range of 5–30 degrees.

20. The apparatus according to claim 12, wherein said angle is in the range of 5–30 degrees.

* * * * *